US006910498B2

(12) United States Patent
Cazden

(10) Patent No.: US 6,910,498 B2
(45) Date of Patent: Jun. 28, 2005

(54) LIQUID LEVEL CONTROLLER

(76) Inventor: Michael L. Cazden, 2342 Thayet Ave., Henderson, NV (US) 89072

( * ) Notice: Subject to any disclaimer, the term of this patent is extended or adjusted under 35 U.S.C. 154(b) by 216 days.

(21) Appl. No.: 10/415,526

(22) PCT Filed: Oct. 15, 2001

(86) PCT No.: PCT/US01/32159

§ 371 (c)(1),
(2), (4) Date: Apr. 29, 2003

(87) PCT Pub. No.: WO02/37007

PCT Pub. Date: May 10, 2002

(65) Prior Publication Data

US 2004/0035465 A1 Feb. 26, 2004

Related U.S. Application Data

(60) Provisional application No. 60/245,005, filed on Oct. 30, 2000.

(51) Int. Cl.[7] .................. F16K 31/06; F16K 31/18; G01F 23/30; G01F 23/00
(52) U.S. Cl. ............... 137/392; 137/386; 4/508; 73/305; 73/313; 340/623; 340/624
(58) Field of Search ................. 137/392, 386; 4/507, 508; 73/305, 313, 308, 304 R; 340/618, 623, 624

(56) References Cited

U.S. PATENT DOCUMENTS

| | | | | | |
|---|---|---|---|---|---|
| 5,660,334 | A | * | 8/1997 | Trusty et al. | 239/691 |
| 5,878,447 | A | * | 3/1999 | Mogab et al. | 4/508 |
| 6,067,854 | A | * | 5/2000 | Yang | 73/305 |
| 6,229,448 | B1 | * | 5/2001 | Bennett et al. | 340/618 |
| 6,276,200 | B1 | * | 8/2001 | Cazden | 73/305 |
| 6,502,461 | B2 | * | 1/2003 | Keller | 73/305 |
| 6,718,567 | B2 | * | 4/2004 | Gibson et al. | 4/508 |

* cited by examiner

Primary Examiner—Kevin Lee
(74) Attorney, Agent, or Firm—Craig M. Stainbrook; Larry D. Johnson; Johnson & Stainbrook, LLP

(57) ABSTRACT

A liquid level control system for detecting and responding to changes in the level of liquid in a container. The system includes a transmitter in radio communication with a receiver, which is in turn connected to a valve assembly. The transmitter unit is programmable to respond to changes in the level of liquid in a container and to emit a radio signal receivable by the receiver unit, which controls the release of liquid to the liquid container via the valve assembly. The signal may be suppressed by a timing circuit in the transmitter circuitry unless and until a liquid level change is sufficiently sustained. The receiver is also programmable to keep the liquid control valve open a predetermined amount of time or to close the valve upon receipt of a high liquid level signal.

11 Claims, 14 Drawing Sheets

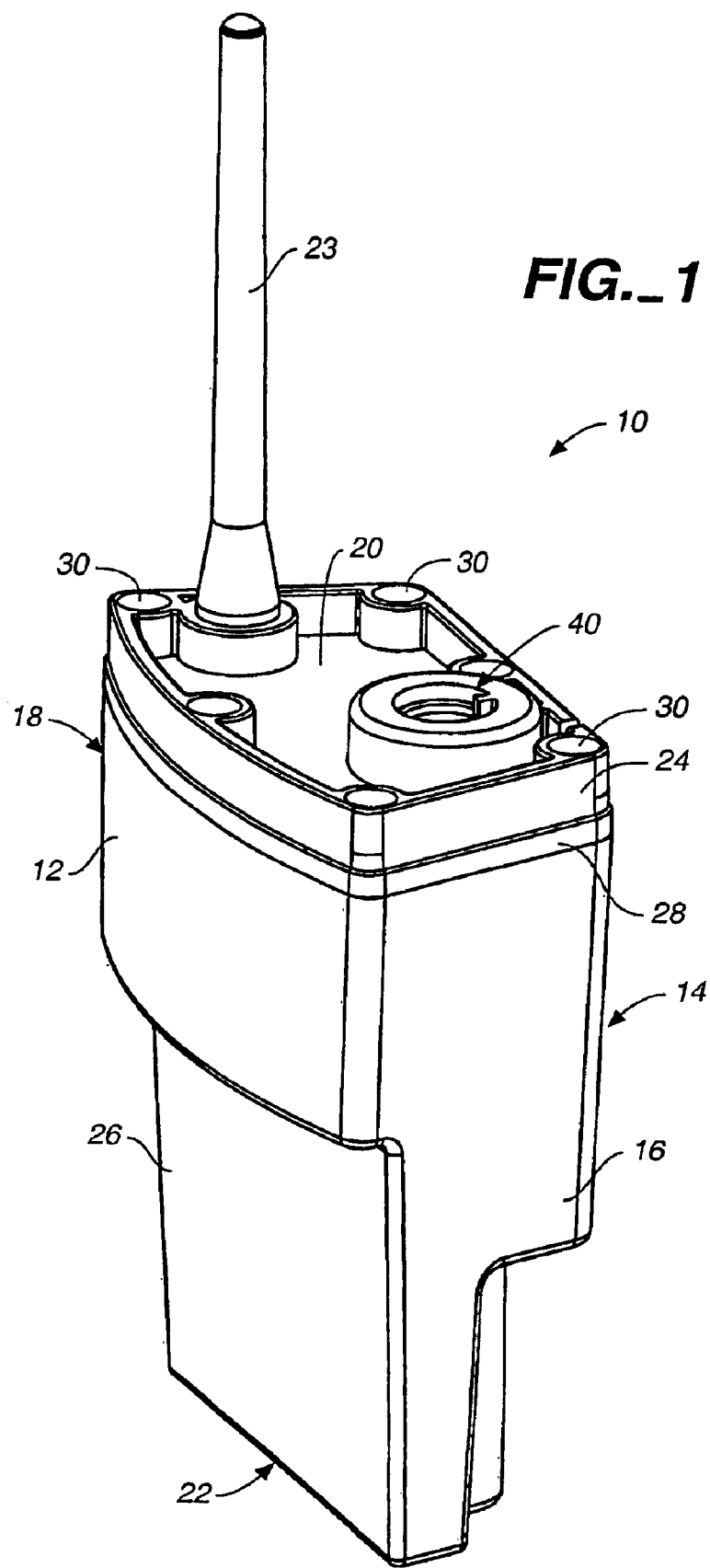
FIG._1

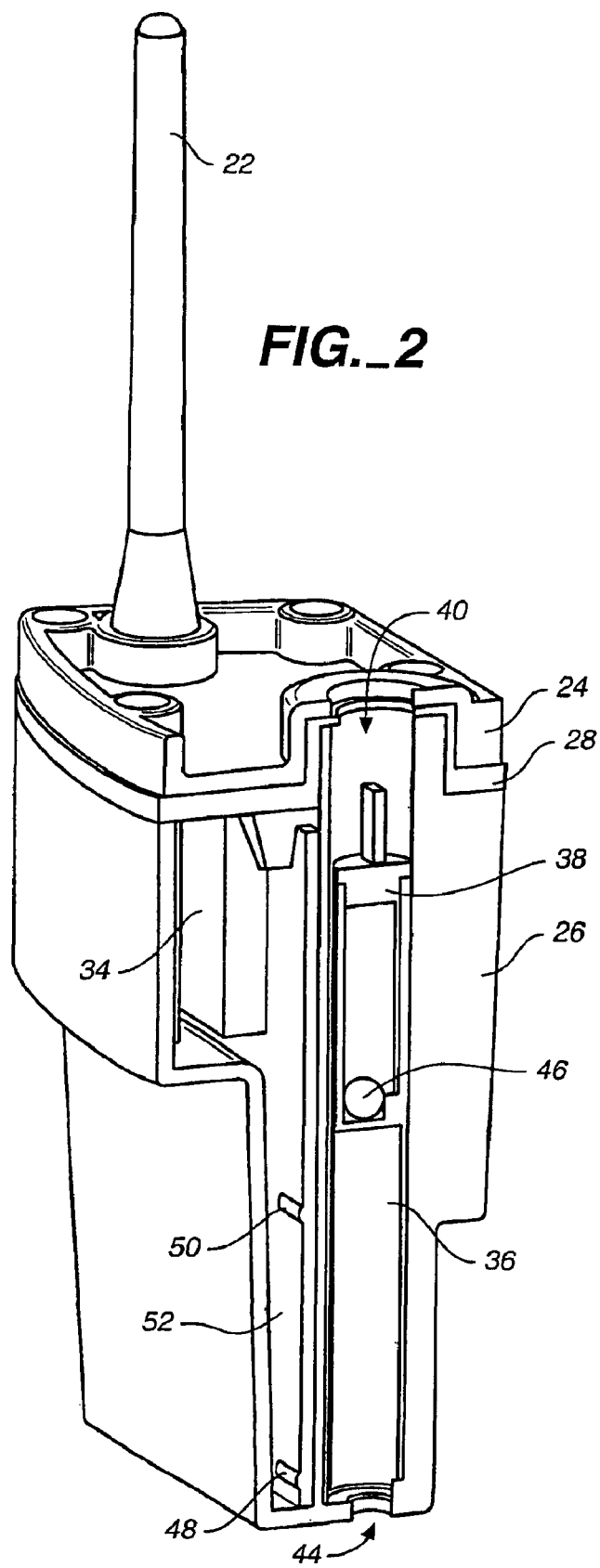
FIG._2

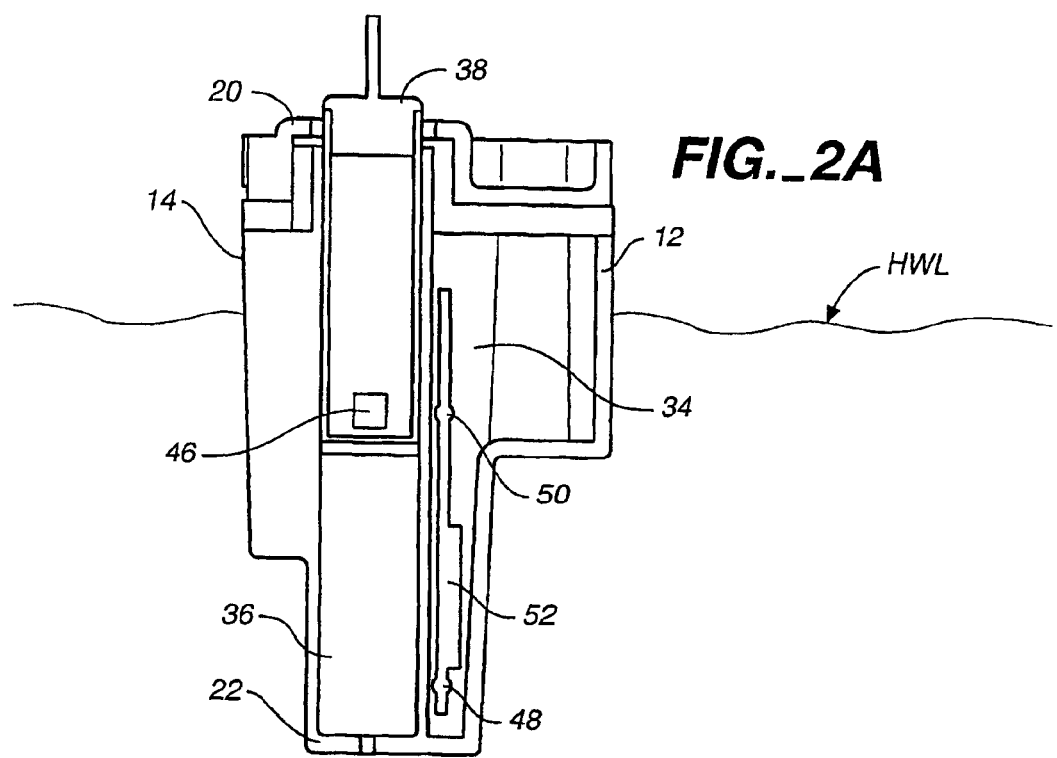
FIG._2A
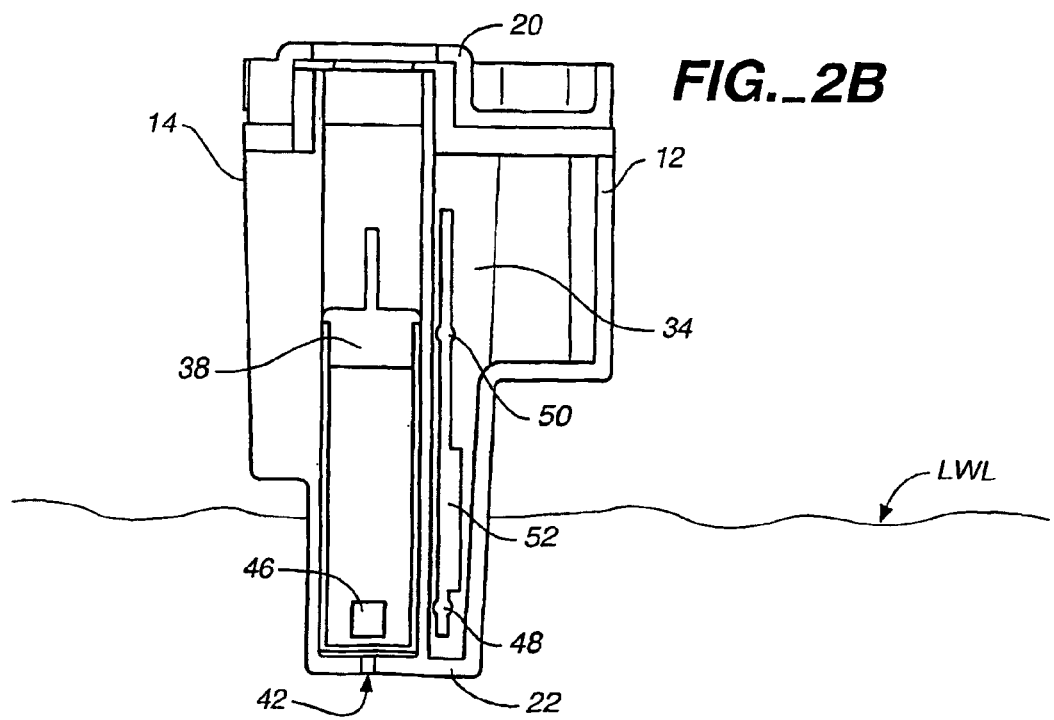
FIG._2B

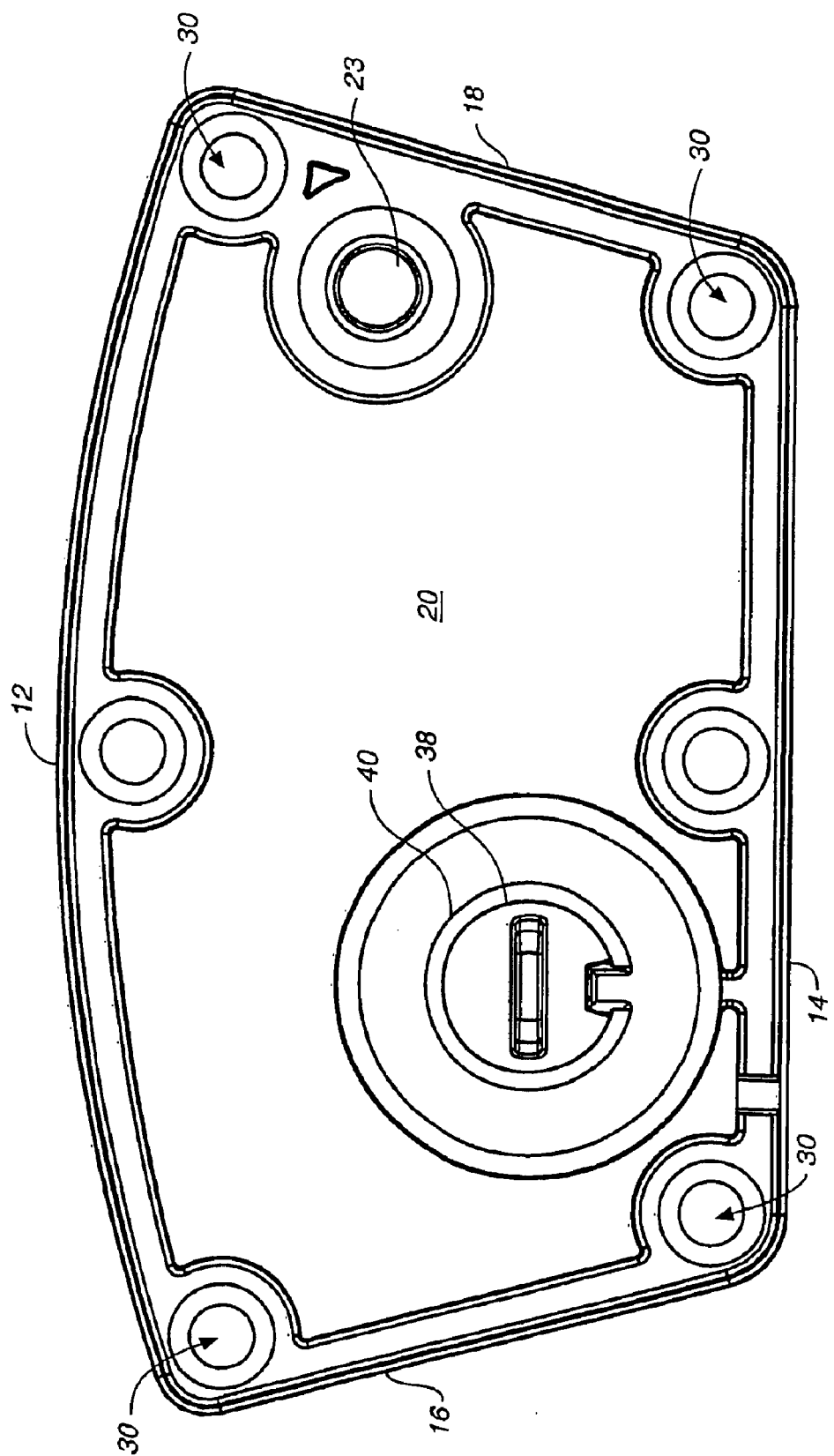
FIG._3

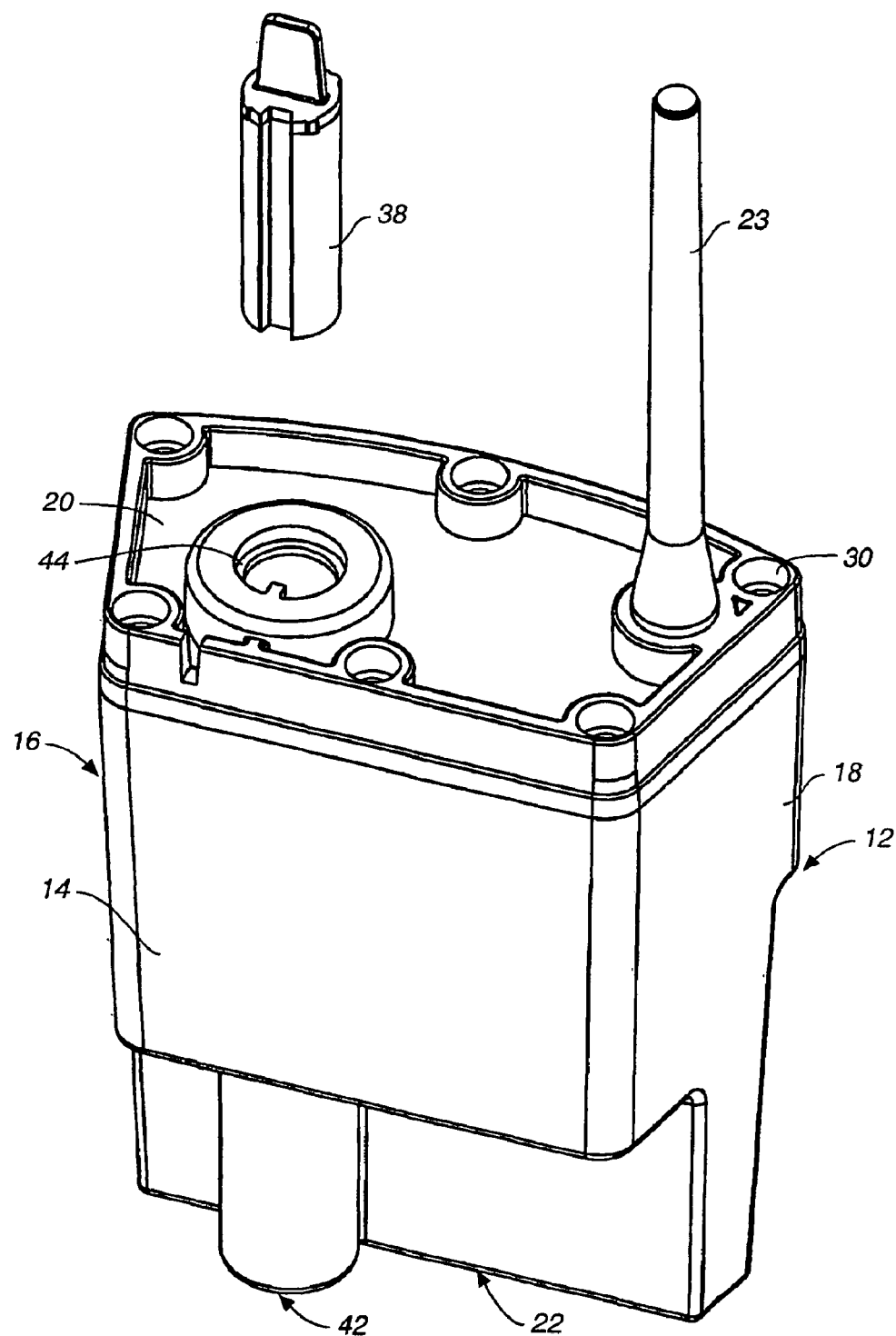
FIG._4

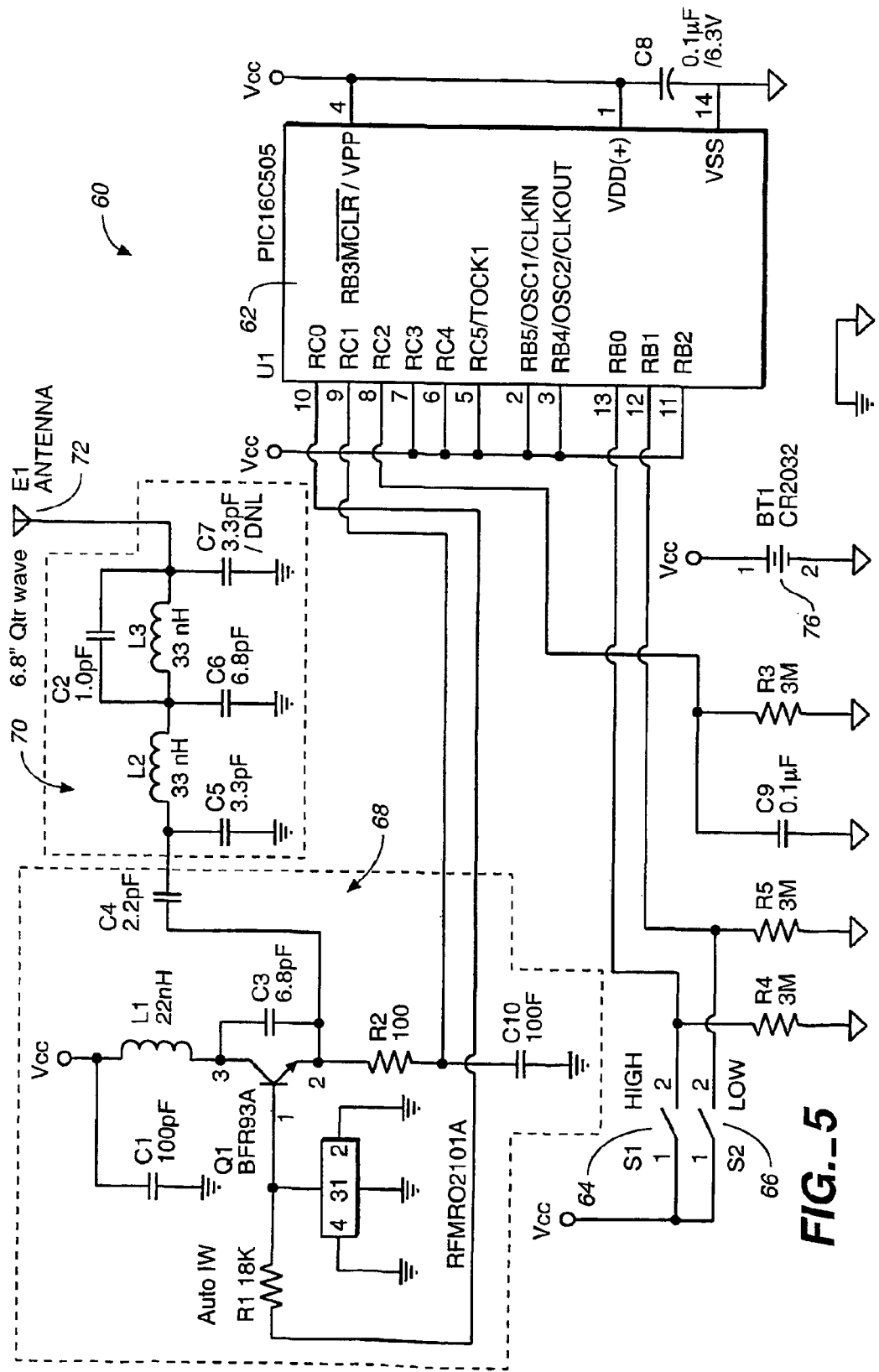
FIG._5

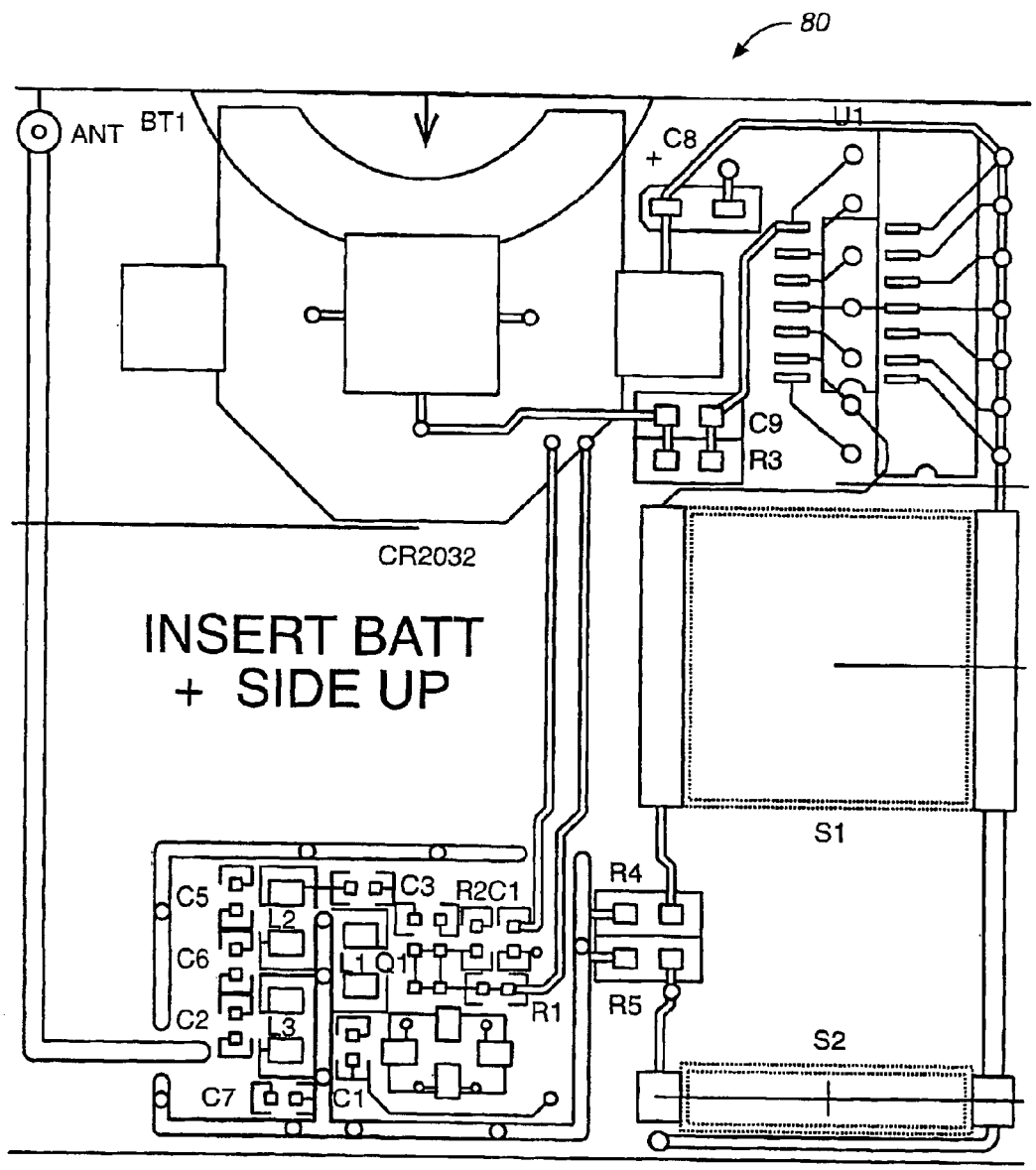
FIG._6

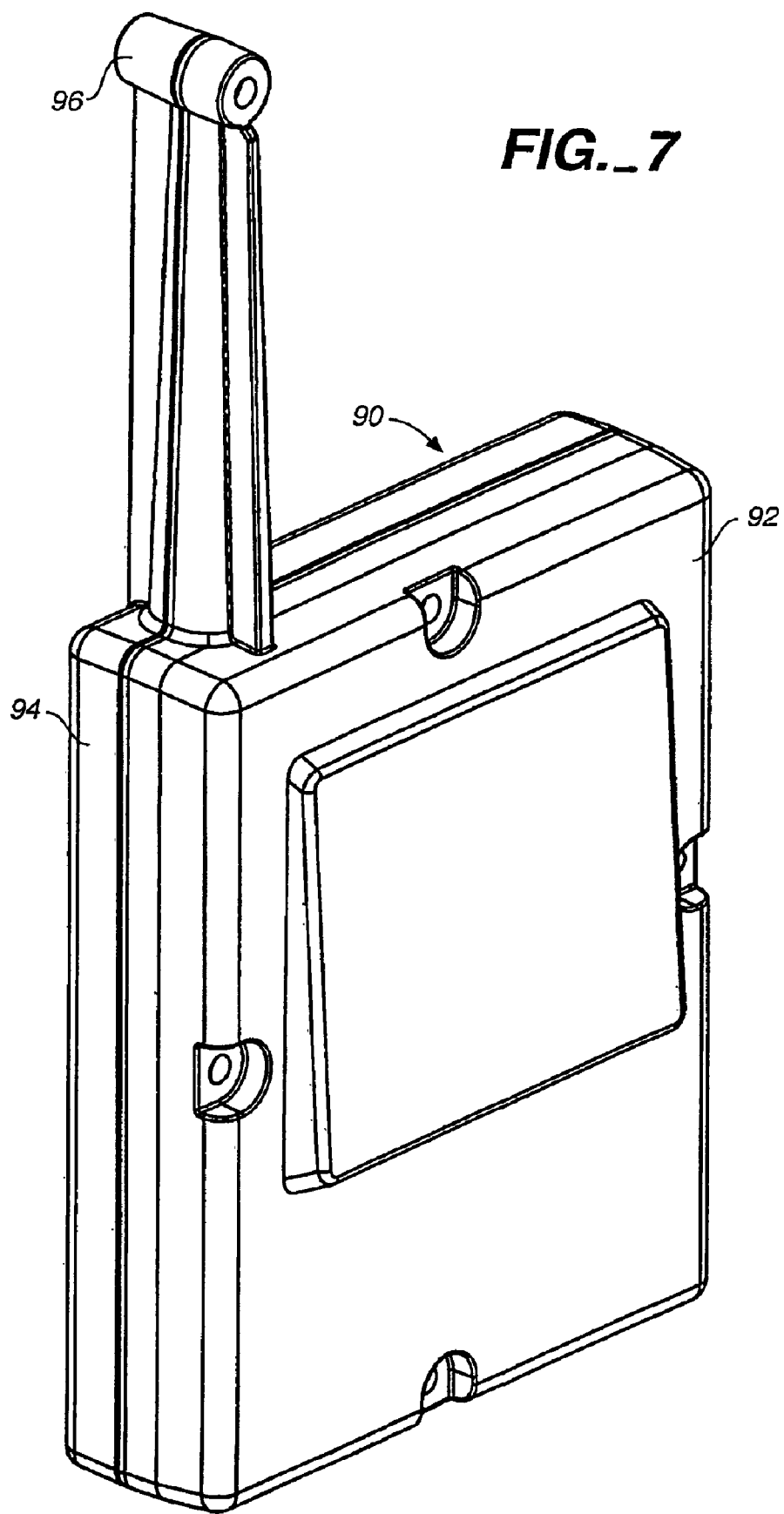
FIG._7

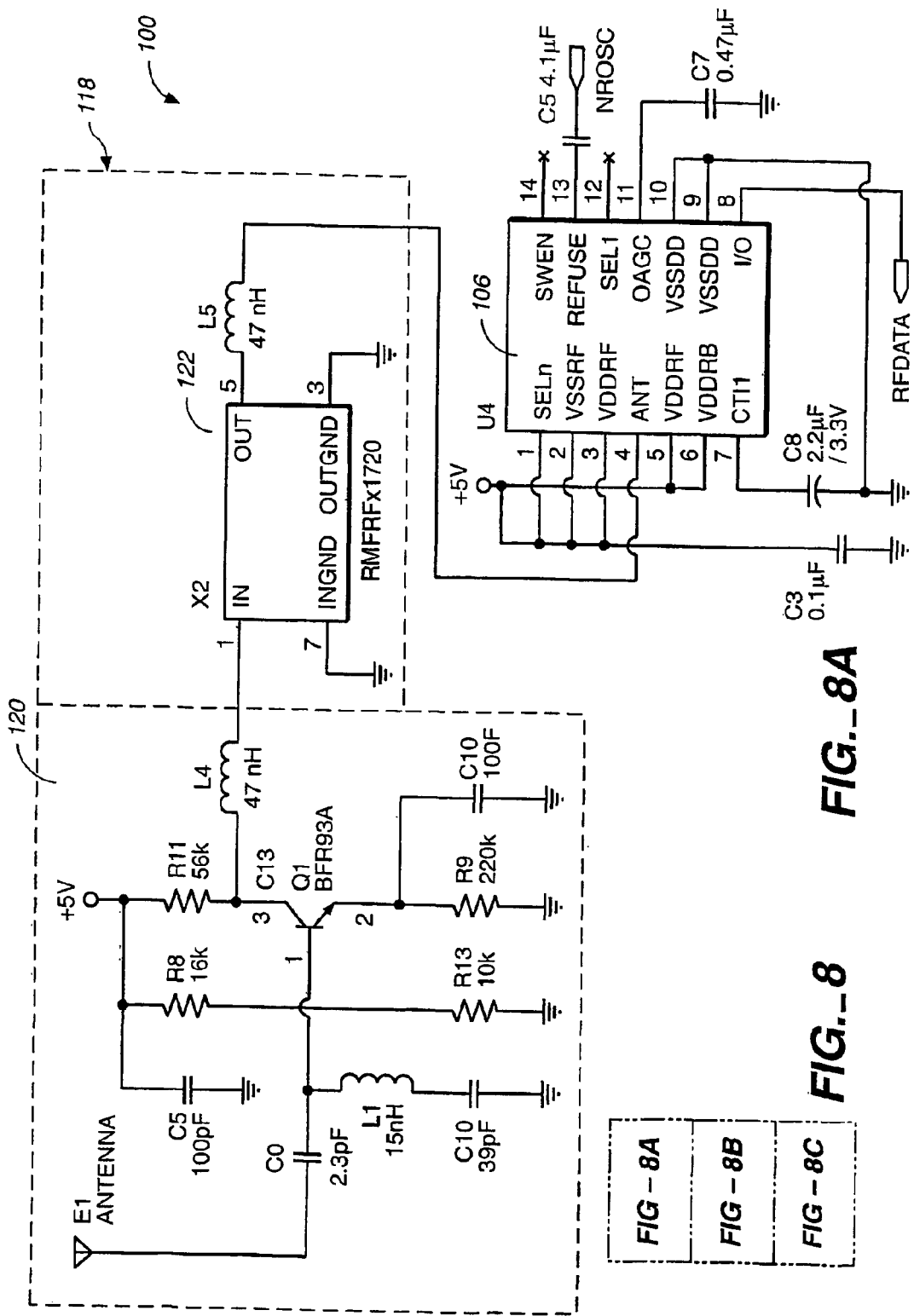

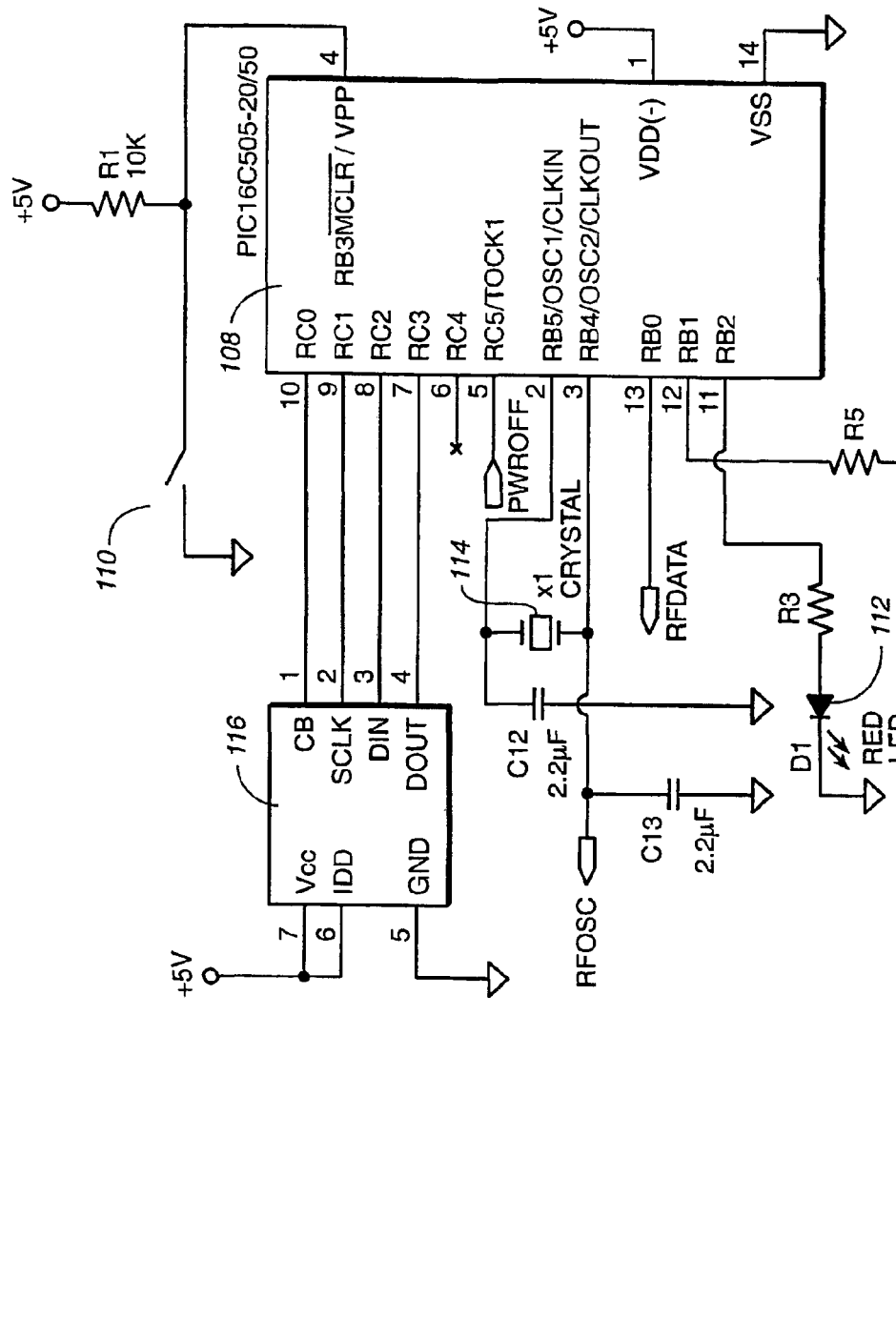
FIG._8B

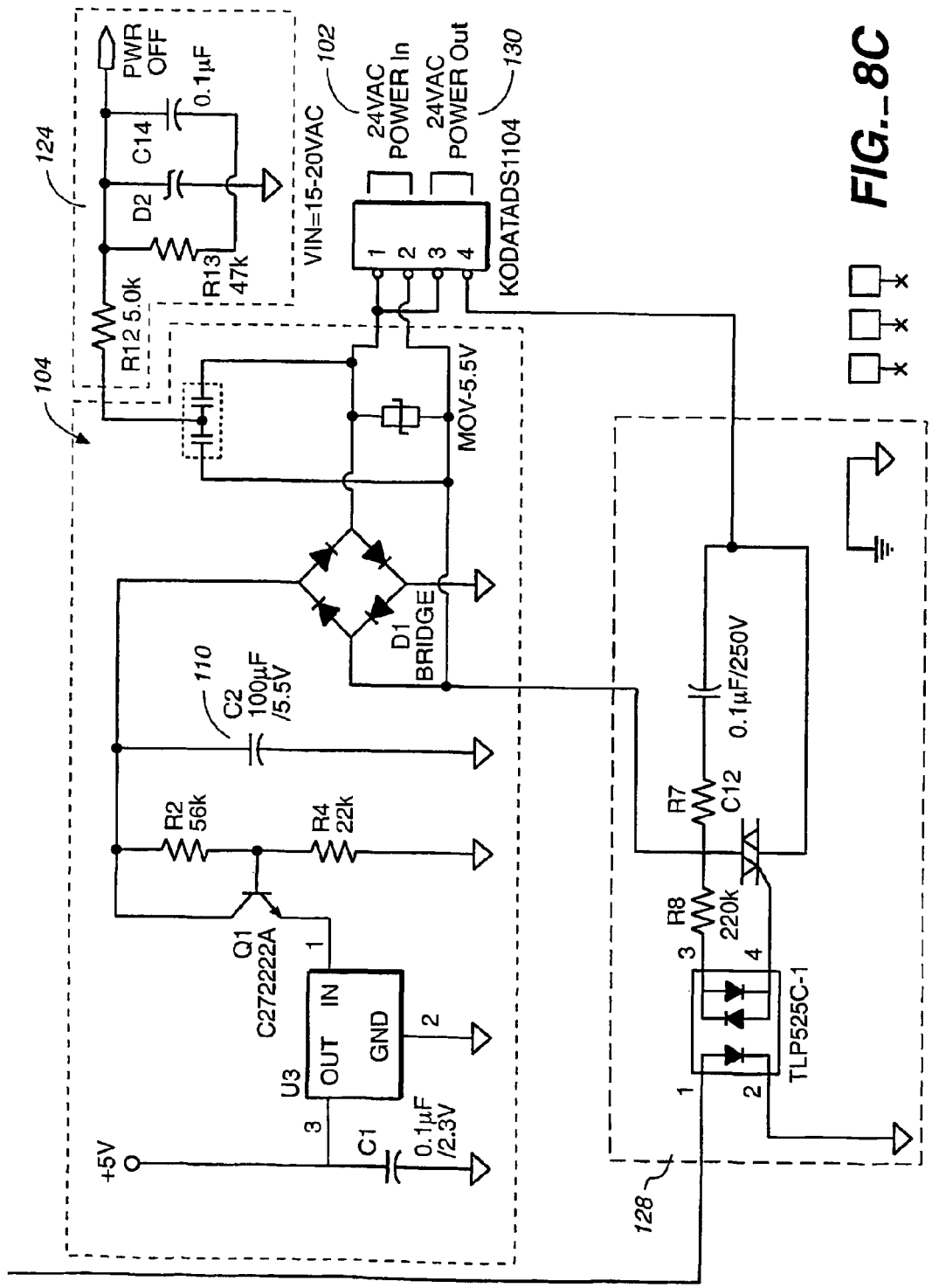
FIG._8C

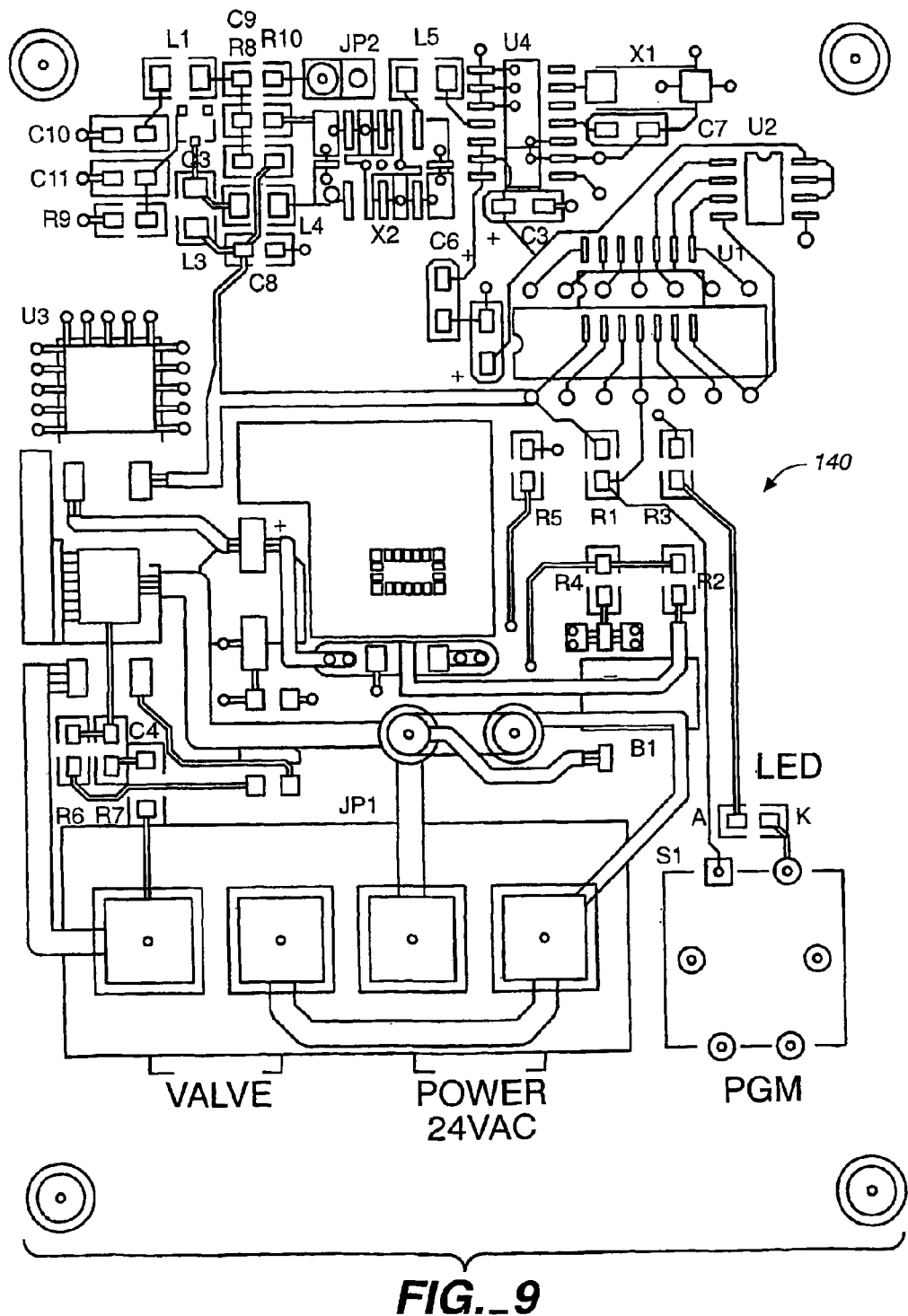
FIG._9

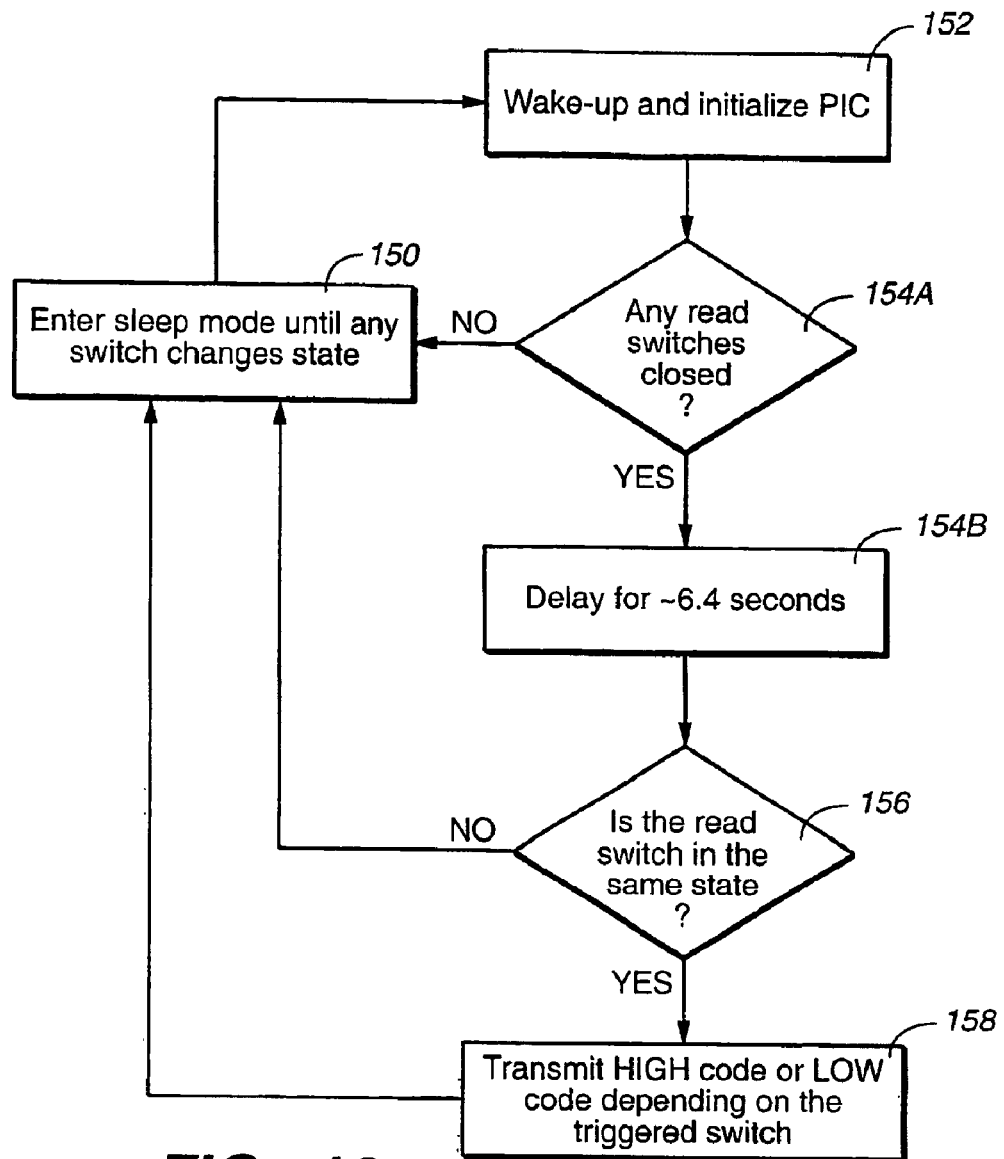
FIG._10

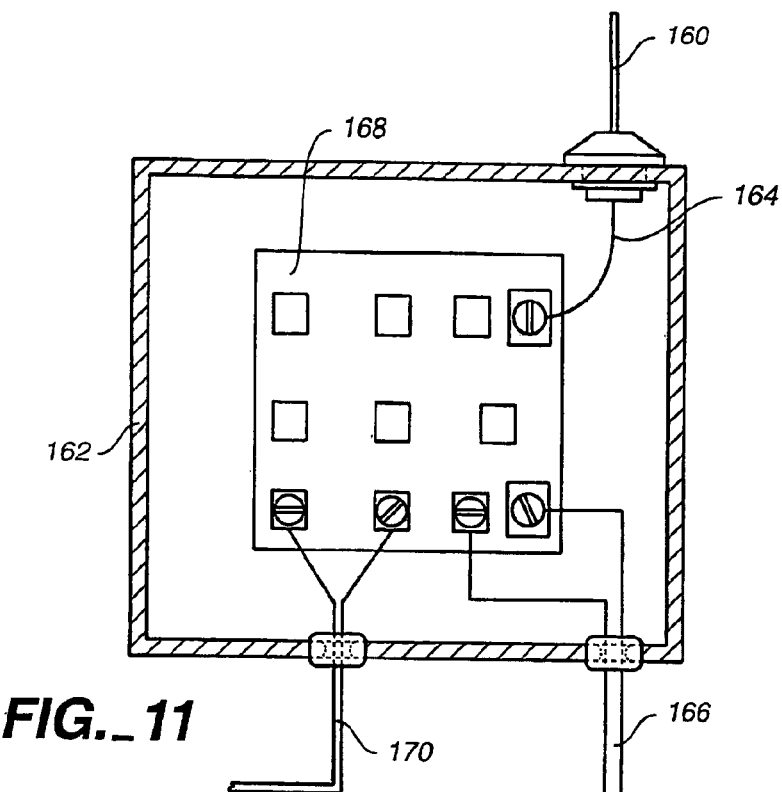
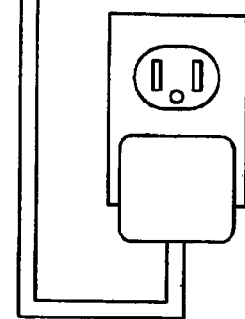
FIG._11
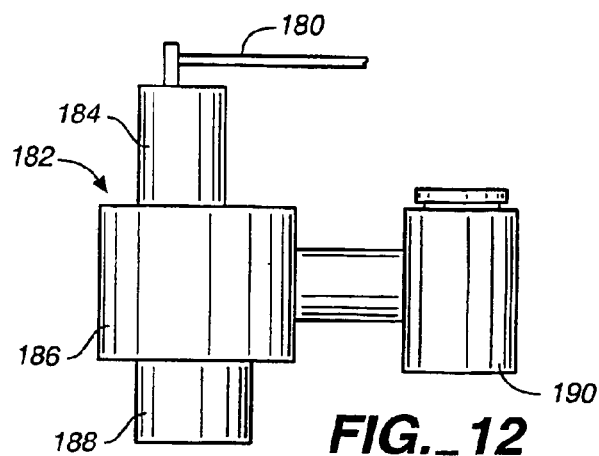
FIG._12

LIQUID LEVEL CONTROLLER

This application claims the benefit of provisional application No. 60,245,005, filed Oct. 30, 2000.

BACKGROUND OF THE INVENTION

1. Technical Field

The present invention relates generally to liquid level controllers, and more particularly to an automatic liquid level control system having a remote sensor for sensing the liquid level in a container, wherein the sensor is in communication with an electronically activated control valve that regulates the fill level in the liquid container.

2. Background Art

Maintaining a constant volume of liquid in a container is important in several industrial and non-industrial arenas. Liquid level variations are particularly problematic when a large surface area of the liquid is exposed to the atmosphere, resulting in large liquid losses due evaporation. This is especially problematic in swimming pools, which also suffer large water volume losses due to splashing.

The reliable control of water level in a swimming pool is imperative for a number of reasons: firstly, pool filters can malfunction if the water level falls too low; secondly, damage to pool surfaces and sidewalls may result from exposure due to low water; thirdly, the chemical balance of swimming pool water depends on tight control of the chemical composition, and this balance is undermined by the addition or removal of large volumes of water, resulting in decreased microbicidal effectiveness and/or discomfort to swimmers due to high chemical concentrations. Thus, automatic control over swimming pool water level is desirable inasmuch as it helps to address these concerns without constant monitoring and intervention.

It is also desirable to provide for the automatic control of swimming pool water level in order to reduce the time and labor involved in correcting deviations from the optimum level. As a practical matter, deviations from an optimum water level may not be noticed until the deviation is quite large, and filing or draining a large volume of water may take several hours in a sizable pool. Accordingly, it is preferable to have a system that constantly monitors and detects small deviations from the optimum water level and regularly makes minor adjustments and corrections as needed.

Several inventions in the prior art employ a float to close an electrical switch and sound an alarm when the float is buoyed to a pre-determined height by water rising in a vessel. The switch is in series with an electrical power source and an alarm, such as a bell or a light, and emits an alarm output signal when the liquid in the vessel reaches a predetermined level. Examples include U.S. Pat. No. 741,759 to Bishop, and U.S. Pat. No. 3,633,193, to Milo. A device deserving notice is disclosed in U.S. Pat. No. 4,771,272 to Barnes, which teaches a liquid level electrical alarm apparatus that comprises a perforated hollow cylindrical sensor housing having upper and lower cup-shaped caps. The housing is suspended from the upper rim of a liquid container by a cable connected to an audible alarm. A cylindrical float contained within the sensor housing contains a permanent magnet near its upper end that closes contact bars of a reed switch element mounted in the upper cap when the float rises a pre-determined level. The sensor body is suspended by a flexible electrical cable connected to the upper cap. Means are provided for adjusting the length of cable from, which the sensor is suspended into a vessel, thereby permitting adjustment of the liquid level which trips the alarm. By means of an alarm, the disclosed devices alert an attendant that a liquid level has arisen to a predetermined level, but they do not provide means for automatically turning on or shutting off a control valve after detecting the level. Thus, manual intervention to correct liquid level disturbances is still required with these devices.

The prior art also includes several systems for automatically controlling the water level of a swimming pool. For example, U.S. Pat. No. 5,878,447 to Mogab et al., discloses an automatic water regulator for automatically filling a swimming pool when the water is below a predetermined level. The water regulator apparatus can be added to any existing built in swimming pool equipped with a skimmer and a water fill line. The water regulator apparatus automatically senses the water level of the swimming pool by attachment to a skimmer lid, establishes if the level is within the allowable range, causes the pool water fill line to turn on if below the allowable range, and subsequently shuts off when the desired water level has been reached. The water regulator apparatus comprises a transmitter assembly and a receiver assembly, which must be fit within a skimmer lid only. The transmitter assembly includes a water level detector that periodically automatically monitors the water level within the pool. If the water level is below a specified threshold, the transmitter assembly sends a radio transmission to be received by the receiver assembly. When the receiver assembly receives the radio transmission, it causes a water fill valve to automatically turn on a water supply to the pool, thereby filling the swimming pool. As the swimming pool is filling, the immersed metal water level detector monitors the water level until the water level has reached the upper immersed metal detector. Once the upper detector has been reached, the transmitter assembly sends a radio transmission to be received by the receiving assembly. When the receiving assembly receives the radio transmission, it causes the water fill valve to automatically turn off the water supply to the pool. This device has application to swimming pools only inasmuch as it is physically configured for attachment to skimmer lid; thus, it is not suited for uses in liquid containers other than swimming pools, as is the present invention.

U.S. Pat. No. 4,380,091 to Lively, discloses circuitry for automatically controlling the water level of swimming pools with a multi-level detecting sensor for directly sensing the pool water. A low voltage oscillator in the input portion of the circuitry detects the presence of water above or below each level sensing electrical contact of the sensor by a change in oscillator amplitude in response to impedance from the contact to ground. Signal threshold circuitry changes in output signal in response to the amplitude of the oscillator signal. Delay circuitry integrates the output of the threshold signal to avoid responding to spurious changes in water level, such as wave action in the pool. Monitor circuitry disposed between the delay circuitry and the water fill, water dump, and pump control circuitry monitors signals received from the sensor or generated by the input circuitry to detect any malfunctions in the sensor or the control circuitry, such as improper sequence of the water level signals, to disable further filling of the pool. Bi-stable switch circuitry controls filling of the pool and is responsive to differing pool levels to cause filling of the pool to commence or to stop.

It is evident that the art is evolving in providing sensing mechanisms having a moveable float and related electronic circuitry in communication with a control valve. However, no device or devices known to date provide a liquid level controller having a receiver in communication with a remote, fully enclosed plastic sensor having (1) programmable logic means for distinguishing anomalous and/or transitory liquid level fluctuations from level changes requiring correction through the opening of a liquid supply control valve, (2) a fail safe shutoff system, and (3) a housing and functional electronics each adapted for installation in any fluid container.

DISCLOSURE OF INVENTION

The liquid level controller of the present invention provides an automatic system for regulating the liquid level in a container. The system is especially well adapted as a retrofitted device for controlling the water level in a swimming pool, though it is equally well suited for newly built pools.

The liquid level controller of the present invention generally comprises a transmitter unit that is placed in the liquid container or pool. The transmitter includes a vertically movable float member, slidably inserted into a float chamber, said float member buoyantly responsive to changes in the liquid level in the container and having means for closing an electronic switch when the liquid level buoys the float to a predetermined height within the transmitter unit. When the switch is closed, the transmitter sends a radio frequency signal to a remotely located receiving unit operatively coupled to a liquid supply valve. The receiver, in turn, activates means to open the valve and permit the flow of additional liquid into the pool. Once the desired level is reached, the transmitter unit sends a second signal to the receiver to close the valve and shut off the supply of water. The transmitter unit, moreover, includes programmable logic means for distinguishing between transitory liquid level fluctuations, caused by splashing, wind induced wave actions, and other kinds of water disturbances, and significant liquid level changes caused by evaporation or the completion of filling, which require correction by the addition of liquid to the container. The logic may be set so that a transmission is not sent from the transmitter unit unless a magnet affixed to the float is in proximity to one of two magnetic- switches for a predetermined amount of time. The device can therefore be programmed so that it is specifically tailored to the type of vessel or container in which it is to be installed. Accordingly, it will not inappropriately respond to the transitory waveforms and other water level disturbances characteristic of the container. The transmitter is designed for easy installation in either a skimmer box or gutter or on the side of the pool. It may be positioned so that the optimum water line falls at any preferred point in the vertical range of the float member, so that the device responds quite sensitively with even the smallest changes in liquid level, or, alternatively, so that it responds only when a significant amount of liquid must be replaced.

BRIEF DESCRIPTION OF THE DRAWINGS

FIG. 1 is a perspective view in elevation of the transmitter unit housing of the liquid level controller of the present invention;

FIG. 2 is a cross-sectional perspective view in elevation of the transmitter unit of FIG. 1;

FIG. 2A is a cross-sectional side view in elevation of the transmitter, also showing the position of the buoyant float at the high water level range of motion;

FIG. 2B is a cross-sectional side view in elevation of the transmitter showing the float member at the low water level range of motion;

FIG. 3 is a top perspective view of the transmitter unit of FIGS. 1 and 2, showing the cylindrical float member inserted in the float chamber;

FIG. 4 is a perspective view in elevation of an alternative embodiment of the transmitter unit, showing the cylindrical float member emerged from, but aligned with, the float chamber;

FIG. 5 is a circuit diagram of the transmitter unit circuitry;

FIG. 6 is a copy of the printed circuit embodying the circuitry of FIG. 5;

FIG. 7 is a perspective view in elevation of the receiving unit of the liquid level controller of the present invention;

FIG. 8 is a circuit diagram of the receiver unit electronic circuitry,

FIG. 9 is a copy of the printed circuit embodying the circuitry of FIG. 8;

FIG. 10 is block diagram depicting the basic operational features of the transmitter unit of the present invention;

FIG. 11 is a partial cross-sectional side view in elevation of the receiver unit and its power source; and FIG. 12 is a partial side view in elevation of a remotely located control valve as would be employed in the present invention.

BEST MODE FOR CARRYING OUT THE INVENTION

FIGS. 1 through: 4 provide various views of the transmitter unit of the liquid level controller of the present invention. FIG. 1 is a perspective view in elevation of the transmitter unit, and FIG. 2 is a cross-sectional perspective view thereof FIG. 2A is a cross-sectional side view in elevation of the transmitter of FIGS. 1 and 2, showing the position of the buoyant float at the high water level range of motion, while FIG. 2B is a cross-sectional side view in elevation of the transmitter showing the float member at the low water level range of motion. Finally, FIG. 3 is a top perspective view of the transmitter unit of FIGS. 1 and 2, showing the cylindrical float member inserted in the float chamber, and FIG. 4 is a perspective view in elevation of an alternative embodiment of the transmitter unit, showing the cylindrical float member emerged from, but aligned with, the float chamber. These views collectively show that the transmitter unit comprises a housing, generally denominated 10, said housing including a front side 12, a back side 14, a right side 16, a left side 18, a top side 20 and a bottom side 22. The front side is preferably slightly actuate for installation against a complementary-shaped side of a skimmer box, while the back side is preferably substantially planar for installation against the side of a pool proximate its upper edge. The transmitter further housing includes a flexible antenna sheath 23 for insertion of a radio frequency antenna. Discrete pieces comprising the transmitter housing preferably include an upper portion 24 and a lower portion 26, and a rubber washer 28 interposed between the two portions to render the unit watertight. The upper portion is securely fastened to the lower portion with a plurality of suitable fasteners (not shown) threadably inserted into a plurality apertures 30 in the upper portion mated with like apertures (now shown) in the lower portion. There is nothing imperative in the selection of upper and lower portions to define the functional compartments of the transmitter unit and to render them watertight, and it may be readily appreciated that opposing front and back or right and left halves might be equally effective.

The transmitter housing defines a circuitry compartment 34 and an interior cylindrical float chamber 36 into which a buoyant cylindrical float 38 is slidably inserted through an opening 40 in the upper portion. The bottom side 22 of the transmitter housing further includes an opening 42 in fluid communication with the liquid to be monitored, but defined so that liquid will flow only into the float chamber to induce vertical movement of the float 38. A rubber grommet or gasket 44 is positioned at the upper end of the float chamber to prevent the float from emerging entirely from the housing under high liquid level conditions.

Float member 38 moves vertically in response to liquid level changes in the container in which it is installed. The level changes are communicated to the float member through liquid that flows into the chamber through opening 42. The float member includes a magnet 46, preferably in its lower portion, which closes a low magnetic switch 48 or a high magnetic switch 50, when the magnet comes into proximity with either switch The switches are part of a transmission circuit and are preferably integrated into a circuit board 52, which is mounted proximate the float chamber in the circuitry chamber.

Referring now to FIGS. 2A and 2B, as may be readily appreciated, when the water level rises to the high water level line, HWL, magnet 46 is in proximity to high magnetic switch 50; when the water level falls to the low water level line, LWL, the magnet 46 is in proximity to the low magnetic switch 48. As set forth more fully below, the programmable logic of the instant invention enables the user to program timing circuitry in the transmitter unit's microcontroller and to tailor the transmitter to send a signal to the receiver unit only if the magnet is in continuous proximity with a switch for a predetermined amount of time. Thus, for example, the transmitter may be programmed to send a signal only if the magnet is in proximity with a switch for approximately 4.0–6.4 seconds. Such sustained proximity has been shown to be associated with actual rises and falls of the overall mean water level in a container. Thus the transmitter is "smart"; it does not send a signal when moved only by sudden or transitory changes in water level due to chop and wave motions induced by swimmer splashing or wind. This prevents unnecessary and erratic operation of the supply valve and extends the battery life of the transmitter power supply.

The control circuitry 60 of the transmitter unit is schematically illustrated in FIG. 5. As may be readily appreciated by those with familiarity with RF circuits, the transmitter unit of the present invention is characterized by a microcontroller 62 that controls both the modulation for the RF transmission and has basic logic to interface with lead high/low switches 64 and 66, respectively. The upper portion of circuit 60 is an RF transmitter uses a SAW resonator and a Colpitts oscillator 68 as are well known in the art, which starts the oscillator for an RF transmission.

A Chebyshev filter 70, well known in the art, is provided to reduce the harmonics from the oscillating circuit, thus stabilizing the fundamental frequency and minimizing unwanted or spurious RF emissions.

In operation, if either switch 64 or switch 66 is closed, in an open-to-closed transition, microcontroller 62 goes out of its sleep mode. The microcontroller will pull the switch if the switch has been closed for set time. Microcontroller 62 will then turn on the RF section of the circuit and will modulate a signal that transmits either a high or a low switch signal via antenna 72. Microcontroller 62 preferably uses a 33/66 percent PWM (pulse-with-modulation) scheme such that ambient noise will not be picked up by receiver, chosen because it is compatible with readily available chip sets, and because when transmitting over RF it is well suited for low power application. A monitoring circuit within the microcontroller monitors switches for a certain amount of time. The microcontroller is one-time programmable and includes "code protection"(code fuses) to prevent tampering after installation.

The power source 76 for the transmitter circuit is preferably a single lithium coin cell, preferably type CR2032 because is stable over temperature and is highly compatible with preferred microcontrollers.

FIG. 6 is a copy of the printed circuit 80 embodying the circuit of FIG. 5.

FIG. 7 is a perspective view in elevation of the receiving unit housing 90 of the liquid level controller of the present invention. The housing is preferably fabricated of molded plastic or polycarbonate, though many suitable alternatives are well known in the art. Such preferable materials are also employed for the transmitter unit. The receiver unit comprises a first half 92 and a second half 94, securely joined by fasteners (not shown) to form a substantially water-tight interior chamber suitable for installing the receiver circuitry illustrated in FIGS. 8 and 9, and further defining an antenna housing 96.

FIG. 8 is a circuit diagram of the receiver unit electronic circuitry 100. This view shows that the receiver circuitry is characterized-by a standard wall transformer 102 which feeds into linear power supply 104.

A super heterodyne receiver 106 (MICRF011) receives a modulated signal from the above-described transmitter, digitizes and modulates the signal, and relays the signal to microcontroller 108 (preferably a PIC15C505-20/SO), which then demodulates the signal and determines whether the address of the original signal identifies an authorized transmitter. Since each transmitter has a unique address to avoid inadvertent activation of the valve assembly, microcontroller 108 performs an address check, and if the signal originates from an authorized transmitter, it determines whether a low or a high signal has been sent. If it is a low signal, it then acts on that signal, and will either turn on control circuit to open a valve to release liquid into the container. The valve will remain open for predetermined amount of time (e.g., 10 min, 30 min. etc.), or until a high switch signal is received a high signal (whichever comes first). Thus, the system is fail safe and when properly programmed will not overfill a container. It should be noted that the time which the valve assembly remains open may be preprogrammed into the microcontroller via programming button 110. Red LED 112 is an indicator for programming and also provides a specific flashing pattern to indicate when the operably connected valve is in operation.

Other well-known components include a crystal oscillation section 114, which creates a stable reference signal used to operate the microcontroller and receiver, and an electronic erasable programmable Read Only Memory (EEPROM) 116, which functions as a storage area for settings for when power lost. Next, an RF section, 118, includes a low noise amplifier 120 that implies the RF signal to overcome losses in FEF (front end filter) 122.

A power off section 124 monitors AC power coming from transformer 126, and when power goes off it immediately notifies microcontroller 108; capacitor 110 then supplies power to the circuit. Microcontroller 108 utilizes the last few fractions of a second of power to save its setting and its state to EEPROM.

Finally, there is provided a control section 128 for the valve assembly solenoid (described below), as is well known in the art, which transmits an electronic signal to open or shut the liquid supply valve via valve out lines 130.

FIG. 9 is a copy of the printed circuit 140 embodying the circuitry of FIG. 8.

FIG. 10 is block diagram depicting the basic operational features of the transmitter unit of the present invention. This view shows that unless and until a switch moves into a closed state, the circuitry remains in a standby or sleep mode 150. When either of the switches are in a closed position, the above-described microcontroller of the receiving unit wakes up 152 and commences a timing operation wherein a predetermined and programmable period of delay is measured, for example 6.4 seconds. As long as the switch remains in the same closed position 154A, the timing operation continues for the preprogrammed amount of time 154B. If after the preprogrammed time the switch is still in the same state 158, a radio frequency HIGH code or LOW code is transmitted 160 to the receiver unit, depending upon which switch is closed for the sustained period of time.

The signal sent by the transmitter unit is picked up by the antenna 160 of the receiver unit 162, as shown in partial cross-sectional side elevation view in FIG. 11. The transmitted signal is communicated through a receiving wire 164 to the receiver circuit of FIGS. 8 and 9 located within the housing depicted in FIG. 7. A power supply 166 provides electrical power to the receiver circuit 168 and one or more activation wires 170 are provided to communicate activation signals from the receiver circuit to one or more electrical devices, such as is illustrated in FIG. 12, which is a partial side view in elevation of a remotely located control valve as would be employed in the present invention.

FIG. 12 shows that activation wires 180 are electrically connected to an actuator valve assembly 182. Upon receipt of an electrical signal from the receiver unit, a solenoid 184 within the valve assembly 186 is activated, causing the valve assembly to close or open. A water supply conduit 188 is connected to a first side of the valve assembly, and a water discharge conduit 190 is connected to a second side thereof. The selective activation of the solenoid by signals transmitted via the activation wires enables control of water flow through the valve assembly by controlling the positioning of the valve assembly.

In summary, when the buoyant float of the transmitter unit is in proximity for the preprogrammed time, the LOW transmission signal will send an actuation signal to the receiver unit, which will, in turn communicate the signal to the solenoid valve of the valve assembly. Liquid will thereby by released via the output conduit to replenish the liquid to a suitable level. As the liquid level rises, the buoyant float rises in response until the buoyant float magnet is in proximity to the HIGH switch. When the magnet remains in proximity to the HIGH switch for the set time, a second transmission signal is sent to the receiver unit and to the valve assembly, actuating the solenoid valve to close and shut off the supply of liquid.

Due to the ease with which the delay or timing circuits may be programmed, the system may be finely tuned to respond as quickly or as slowly as is determined to be optimum under the circumstances. In an application or liquid container in which level change tolerances are quite low and disturbances in the liquid level are highly controlled, the system may be tuned to respond almost immediately to level changes. On the other hand, in an application (such as a swimming pool) where water level change tolerances are moderate and dramatic water disturbances are expected, the system can be programmed to respond only after the switches have remained in a sustained closed position for a long period of time.

While this invention has been described in connection with preferred embodiments thereof, it is obvious that modifications and changes therein may be made by those skilled in the art to which it pertains without departing from the spirit and scope of the invention. For example, it is contemplated that the transmitter and receiver unit housings could comprise any of a number of suitable configurations without in any way affecting their operation. These alternatives would be readily evident to one skilled in the art. Accordingly, the scope of this invention is to be limited only by the appended claims.

What is claimed as invention is:

1. A liquid level control system for detecting and responding to changes in the level of liquid in a container, characterized by:

a self-powered remote transmitter unit removably mountable in the liquid container, said transmitter unit comprising a transmission housing that defines a circuitry chamber and an interior float chamber, said transmission housing further having an opening in the lower portion of the float chamber such that said float chamber is in fluid communication with the liquid in the container;

a buoyant float slidably inserted into said float chamber, said float vertically movable within said float chamber in response to changes in liquid level in the container, said float including a float magnet;

a transmission circuit adapted for transmission of a radio frequency signal, said transmission circuit installed in said circuitry chamber and having a high magnetic switch and a low magnetic switch, each of which may be selectively positioned to define the high and low limits of a range of liquid levels, said switches in magnetic communication with said float magnet so as to close when in proximity with said magnet and to enable the transmission of a radio signal corresponding with said high or low liquid level, said transmission circuit including a programmable timing circuit which will prevent transmission of a radio signal unless and until said float magnet has been in proximity with one of said switches for a pre-programmed length of time;

an antenna connected to said transmission circuit and housed within an antenna sheath extending from said transmission housing; and a receiver unit in radio frequency communication with said transmitter unit;

an electronically actuated valve assembly in electronic communication with said receiver unit, said valve assembly in fluid communication with said liquid container.

2. The liquid level controller system of claim 1 wherein said transmission circuit is an integrated circuit.

3. The liquid level controller system of claim 1 wherein said transmission housing includes a front side, a back side, a right side, a left side, a top side, and a bottom side.

4. The liquid level controller system of claim 3 wherein said front side is actuate, and said back side is substantially planar.

5. The liquid level controller of claim 3 wherein said transmitter housing includes mating upper and lower portions and a rubber washer interposed between the two portions for a watertight seal.

6. The liquid level controller of claim 1 wherein said float chamber includes a grommet to prevent said float from emerging from said float chamber.

7. The liquid level controller of claim 1 wherein said transmitter unit is powered by at least one battery.

8. The liquid level controller of claim 1 wherein said receiver unit includes an integrated electronic circuit.

9. The liquid level controller of claim 1 wherein said receiver unit includes an electronic circuit having a receiver that digitizes and modulates said signal from said transmitter and relays said signal to a microcontroller, which demodulates said signal and determines whether the address of the original signal identifies an authorized transmitter.

10. The liquid level controller of claim 9 wherein said receiver unit microcontroller determines whether a low or a high signal has been sent from said transmitter unit and based on the type of signal electronically activates a control circuit to open an electronically actuated valve to release liquid into the container or to close the valve.

11. The liquid level controller of claim 9 wherein said receiver unit microcontroller is programmable to keep said valve open a user-defined amount of time or to shut off the valve when a high switch signal is received, whichever comes first.

* * * * *